Feb. 6, 1951     A. W. LILLIENBERG     2,540,744
INDUCTION FURNACE
Filed Oct. 1, 1948     3 Sheets-Sheet 1
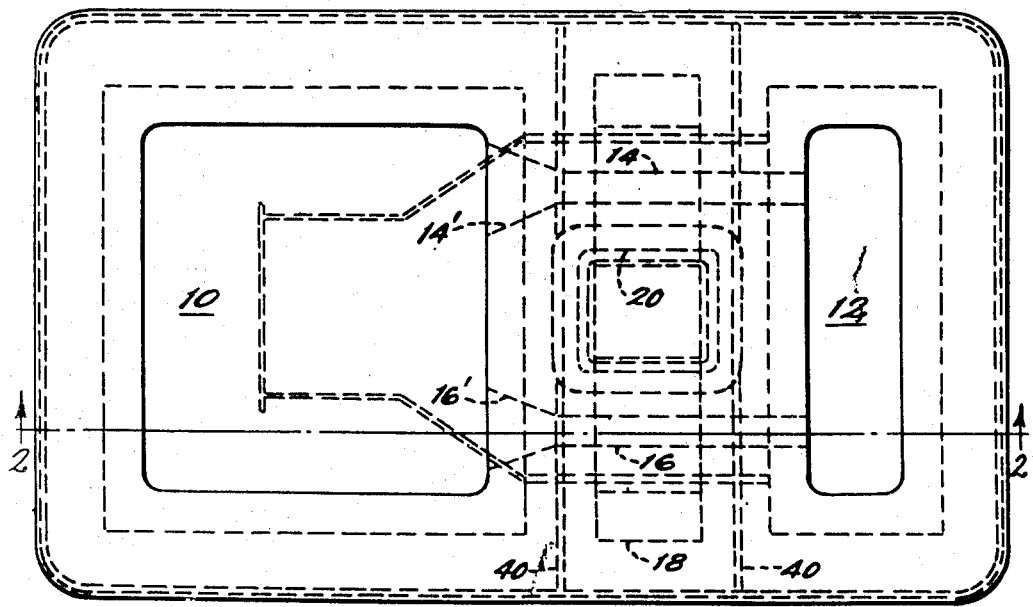
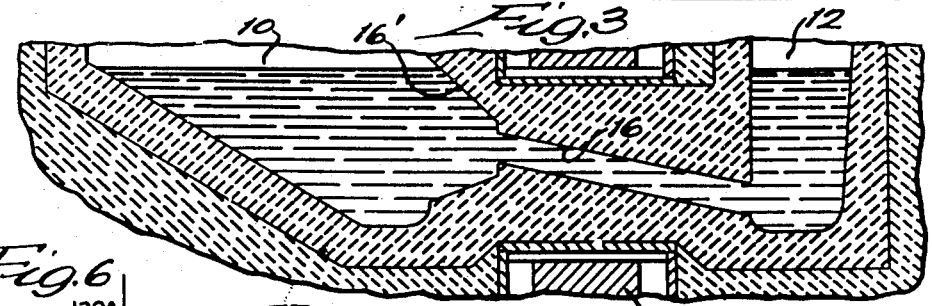
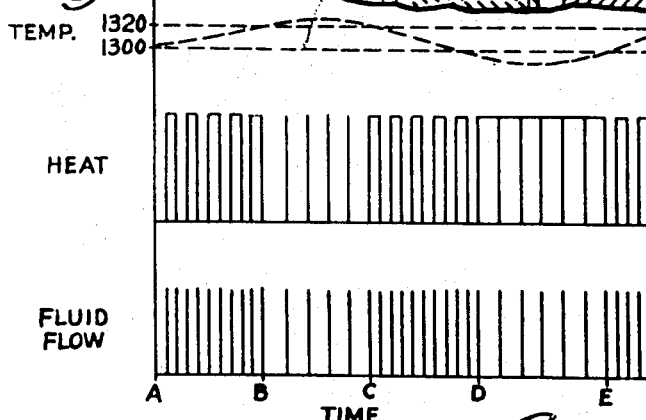
Inventor: August W. Lillienberg Feb. 6, 1951     A. W. LILLIENBERG     2,540,744
INDUCTION FURNACE
Filed Oct. 1, 1948     3 Sheets-Sheet 2
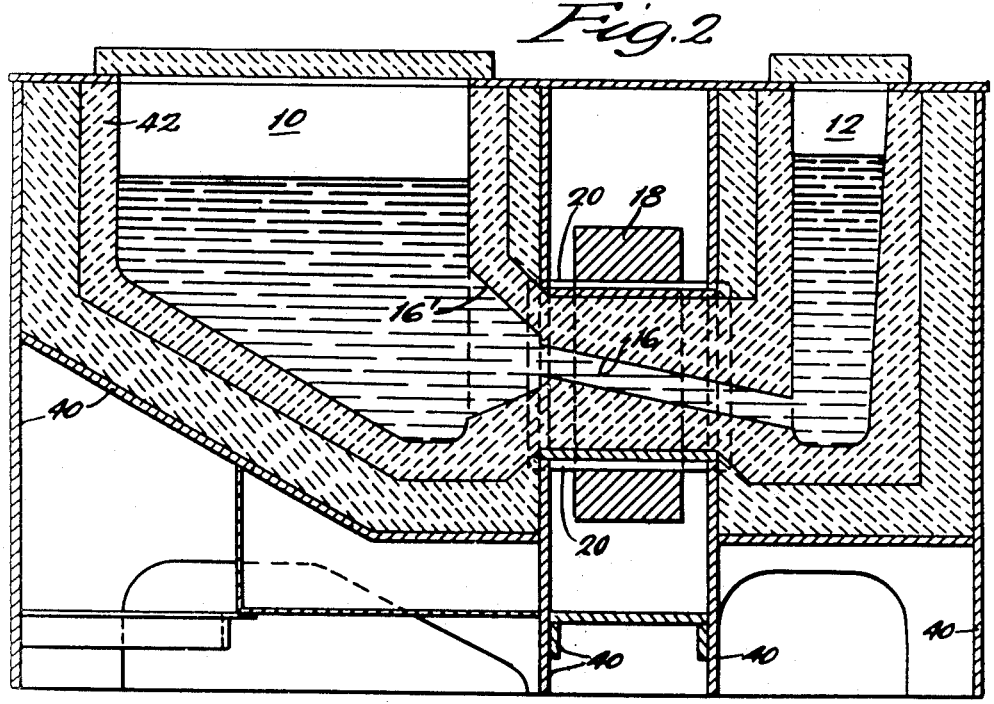
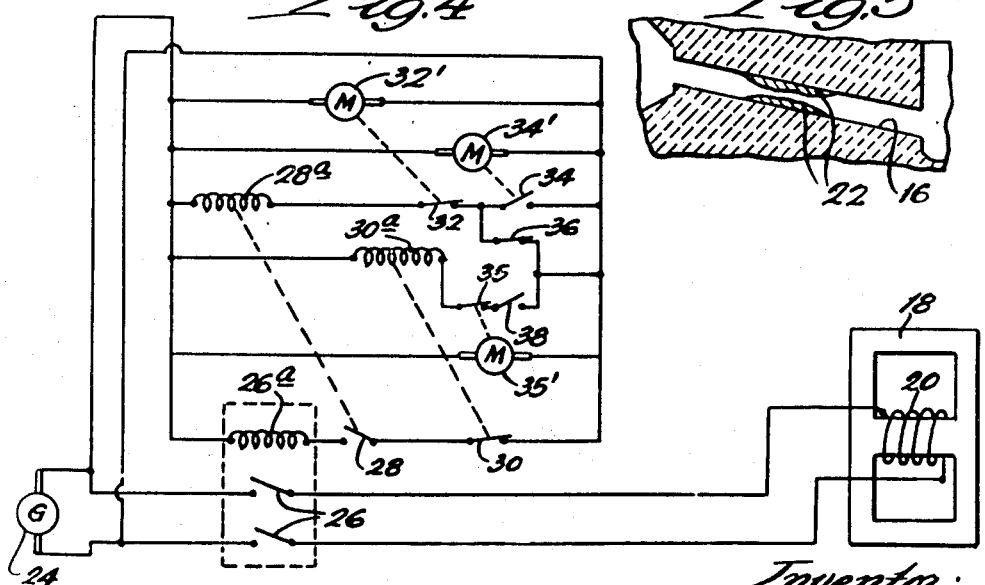
Inventor:
August W. Lillienberg

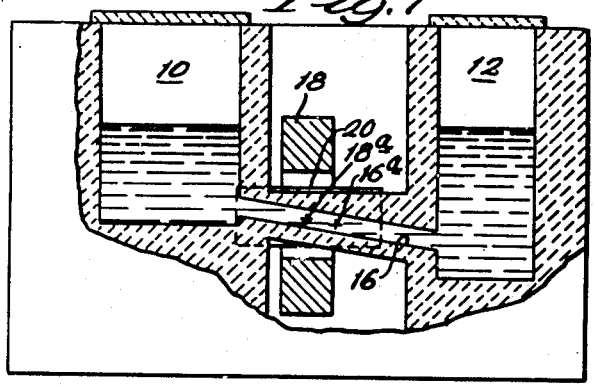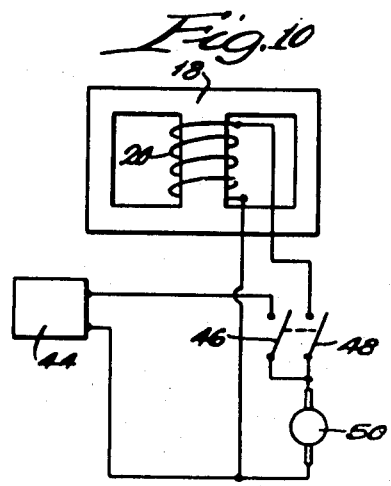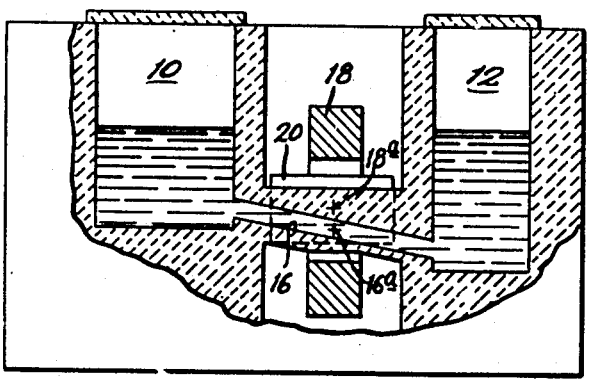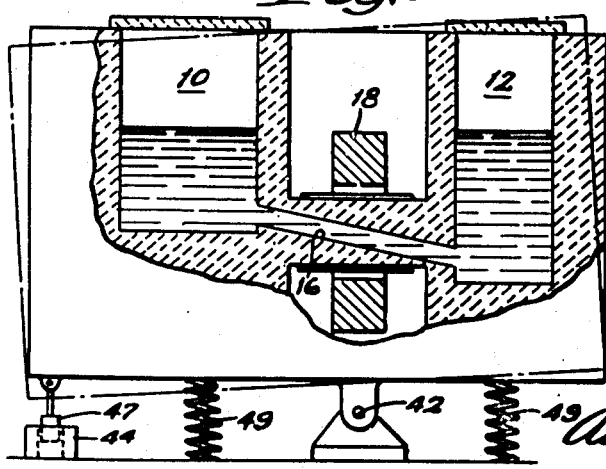

Patented Feb. 6, 1951

2,540,744

UNITED STATES PATENT OFFICE 2,540,744

INDUCTION FURNACE

August W. Lillienberg, Chicago, Ill., assignor to Lindberg Engineering Company, Chicago, Ill., a corporation of Illinois Application October 1, 1948, Serial No. 52,276

22 Claims. (Cl. 13—29)

My invention relates to an improved furnace of the type having a pair of chambers connected by channels for handling molten metal.

In one type of metal melting or holding furnace, two spaced chambers or reservoirs are joined by at least two fluid channels, thereby defining a closed path for current flow. A magnetic core encircles this path and is provided with a suitable winding to receive alternating energizing current. In operation, ingots or molten metal are introduced into one of the chambers (the charging chamber) and the molten metal is withdrawn from the other chamber (the pouring or ladling chamber).

The two chamber type induction furnace is subject to a substantial disadvantage because of the tendency of the channels between the chambers to clog. In furnaces intended for aluminum this effect is particularly troublesome and large bodies of dross accumulate in the channels. Moreover, mechanical methods of cleaning the channels to prevent accumulation of dross are relatively ineffective and tend to cause damage to the walls of the channels, thereby roughening the walls and encouraging further deposit of dross.

When the dross deposited in the channels of an induction furnace becomes excessive, the only way to prepare the furnace for further operation is completely to replace the obstructed channels. This entails a lengthy outage with the consequent overhead costs and inconvenience as well as loss of production.

In accordance with the present invention, deposit of dross on the channel walls of a two-chamber induction furnace, is prevented from starting by causing cyclic fluid flow through the channels. This fluid flow produces a flushing action which recurrently agitates the particles of dross and thereby avoids the initial deposit on the walls of the channels. In particular, in accordance with the present invention, surges of fluid flow through the channels are caused to take place at predetermined time intervals irrespective of the furnace heating demand to develop a continuous flushing action which overcomes the tendency of the dross to deposit.

The two-chamber induction melting furnace has another disadvantage in that the temperature in one chamber or reservoir may vary considerably from the temperature in the other. This is particularly true when a fresh charge is applied as the temperature in the charging reservoir is depressed by the relatively cool charge and the temperature of the pouring or ladling reservoir does not tend to be changed. If the temperature control system is sensitive to the fluid temperature in one of the reservoirs, this effect may actually cause heat to be applied when the metal in the pouring or ladling chamber is too hot or it may cause heat to be turned off when the metal in the melting or charging chamber is too cool.

In accordance with the present invention, the heat distribution between the two chambers of the furnace is made substantially uniform by causing timed surges of flushing fluid flow between the chambers. Each chamber thereupon partakes of the temperature of the other and the temperature control equipment is effective even though directly responsive only to the temperature of one chamber.

Moreover, it is frequently desirable to provide a greater heat input to one of the fluid reservoirs or chambers than to the other. This operation may be dictated, for example, by the fact that cool charges are being placed in the charging reservoir and the applied energy must not only maintain that chamber at a preset temperature but, in addition, must supply the additional latent heat incident to the melting process.

In accordance with the present invention the distribution of heat between the two chambers is controlled by disposing the energizing core in spaced position relative to the center of the channels. This causes the heat imparted to one chamber to correspond with the heat input to a longer length of the channel than to the other, thereby heating one chamber or reservoir to a greater extent than the other.

It is accordingly a general object of the present invention to provide an improved two-chamber melting furnace.

Another object of the present invention is to provide an improved two-chamber type melting furnace in which the initial deposit of dross on the walls of the channels is prevented.

Further it is an object of the present invention to provide an improved two-chamber induction melting furnace in which flushing action is achieved at predetermined time intervals.

Yet another object of the present invention is to provide an improved two-chamber melting furnace having flushing action at predetermined time intervals but which is susceptible to precise temperature control of the charge.

Still another object of the present invention is to provide an improved melting furnace construction wherein recurrent surges of fluid flow flush the fluid channels and which embodies features of construction, combination and arrangement rendering it suitable for use with a wide variety of furnace constructions.

Yet another object of the present invention is to provide an improved control mechanism for an electric furnace of the type wherein energization or deenergization imparts flushing fluid flow.

It is still another object of the present invention to provide an improved furnace wherein frequent mixing of the molten charge due to timed surges of fluid flow minimizes the temperature differences in the channels and reservoirs.

Another object of the present invention is to provide an improved electric furnace wherein greater heat is applied to one chamber or reservoir than to the other.

Still another object of the present invention is to provide an improved two-chamber induction furnace wherein a temperature control mechanism responsive to the temperature in one chamber effectively maintains the temperature of the entire furnace at a preset value.

The novel features which I believe to be characteristic of my invention are set forth with particularity in the appended claims. My invention itself, however, both as to its organization and method of operation, may best be understood by reference to the following description taken in connection with the accompanying drawings in which:

Figure 1 is a top plan view of an induction furnace constructed in accordance with the principles of the present invention;

Figure 2 is a cross-sectional view through axis II—II, Figure 1, and showing the furnace in the energized condition;

Figure 3 is a view like Figure 2 but showing the furnace in the unenergized condition;

Figure 4 is a schematic circuit diagram of the control mechanism for the furnace;

Figure 5 is a fragmentary view showing how deposits tend to form on the walls of the channels of the furnace of Figures 1 to 3;

Figure 6 is a chart illustrating the operation of the furnace of Figures 1 to 5;

Figures 7 and 8 are side elevational views with parts in cross-section showing alternative embodiments of the present invention;

Figure 9 is a side elevational view with parts in cross-section of still another embodiment of the present invention; and Figure 10 is a schematic circuit diagram of the embodiment of Figure 9.

Referring now to Figures 1 and 2, there are shown at 10 and 12 a pair of fluid reservoirs or chambers. In a melting furnace, the large reservoir, 10, is the charging reservoir and receives ingots of aluminum or like material to be melted for casting. The small reservoir, 12, is the pouring reservoir from which the molten metal is poured into suitable molds. In a holding furnace, where the charge is molten metal and ladling is ordinarily done by hand, the large reservoir, 10, is the ladling chamber and the small reservoir, 12, is the charging chamber.

The chambers 10 and 12 are connected by a pair of spaced channels 14 and 16, Figures 1 and 2. In the top plan view of Figure 1 these are parallel and in the cross-sectional view of Figure 2 they are at a slight downward slope between chamber 10 and chamber 12. These channels form a means of fluid communication between reservoirs 10 and 12.

A laminated magnetic transformer core 18 of silicon steel or like material is positioned between the refractory housings which define reservoirs 10 and 12. This core is of rectangular shape and has a pair of spaced windows through which channels 14 and 16 extend. A winding 20, Figure 1, encircles the central leg of core 18 defined by these windows.

In operation of the furnace the winding 20 is energized with alternating voltage. This sets up a time varying magnetic flux in core 18 which encircles both channel 14 and channel 16 and thereby induces alternating voltage in the conducting loop which may be traced from reservoir 10, to channel 16, reservoir 12, channel 14, and back to reservoir 10. Since these are all filled with molten conducting material, such as aluminum, current flows in this loop and produces power losses to melt the charge.

In addition to causing current flow in channels 14 and 16, and reservoirs 10 and 12, energization of the coil 20 develops electro-mechanical forces due to the interaction of the various currents and the magnetic fields in the apparatus. It is these reactions that are believed to account for the operation of the subject invention.

Considerable difficulty has been encountered with furnaces of the general type shown in Figures 1 and 2 because of the tendency for deposits of dross or other material to accumulate in the portions of the channels 14 and 16 axially aligned with core 18 and winding 20. In the structure of Figures 2 and 5, this point is the central portion of the channel midway between reservoirs 10 and 12. Figure 5 shows the nature of a deposit of this type. It will be evident from that figure that the deposits 22 are substantially in the center of the channel 16 and that they greatly reduce the cross-sectional area of that channel available for passage of molten charge. It is believed that the deposits form at the central regions of these channels because of the electro-mechanical reactions associated with the current flow and the magnetic field. These are believed to establish fluid pressures in the channels urging the conducting melt away from the center portions thereof and hence to cause the dross to accumulate in these portions.

In accordance with one form of the present invention, the cross-sectional area of the channels 14 and 16 is increased towards one of the reservoirs 10 and 12, thereby causing the longitudinal centers of these channels to be displaced relative to the core 18 and winding 20. That is, the centroid of the area defined by an axial cross-section through the channel is displaced relative to the core 18 and the winding 20.

I have discovered that when channels 14 and 16 are enlarged as described above, a longitudinal fluid pressure is created along these channels when the furnace is energized by application of power to winding 20. This pressure manifests itself by a differential in fluid level in reservoirs 10 and 12, the level in reservoir 12 rising relative to the level in reservoir 10 in the case of the structure shown in the drawings. Figure 2 shows the fluid level during the energized condition.

On the other hand, when application of power on coil 20 is interrupted no longitudinal fluid pressure differential exists along channels 14 and 16. In this case the fluid in reservoirs 10 and 12 seeks its own level because of the communication provided by these channels. This condition is shown in Figure 3.

In accordance with the present invention the foregoing fluid pressure is utilized to prevent buildup of the deposits 22, Figure 5, in the channels 14 and 16. This is accomplished by suddenly energizing or deenergizing the coil 20 at predetermined time intervals to create or eliminate the fluid pressure differential along the channels 14 and 16. Fluid flow in channels 14 and 16 in response to this pressure change flushes these channels to remove any deposits therein that may have occurred during the time interval.

When the coil 20 is deenergized, the flushing action is believed to be especially effective because the material deposited appears to be magnetic and a magnetic field apparently urges this material against the wall and the channel. When the energizing current is interrupted, this material is believed to be released and is free to flow longitudinally and radially of the channels along with the general flow of flushing fluid that results from loss of the fluid pressure differential along the channel.

In addition to preventing build-up of deposits, the flushing fluid flow mixes the molten metal into the two chambers 10 and 12. This mixing action causes the temperature of the fluid in each chamber to partake of the temperature of the fluid in the other chamber and thereby tends to equalize the temperature throughout the entire body of fluid.

The sudden energization or deenergization of coil 20 is rendered more effective by the oscillations that occur between the fluid levels in reservoirs 10 and 12 due to the inertia of the moving fluid. This oscillation causes fluid flow in both directions through channels 14 and 16 whether power is suddenly applied or suddenly interrupted to provide particularly effective flushing action and to mix the fluid in chambers 10 and 12 most completely.

Since the flushing action occurs at predetermined regular time intervals, corresponding to the timed pulses of energy applied to winding 20, any deposits in channels 14 and 16 are flushed in the very early stages of formation when they are not firmly held on the surface of these channels.

Further in accordance with the present invention, the sudden changes in the energization of winding 20 are correlated with the operation of the temperature control mechanism to provide effective flushing action while at the same time interfering to a minimum degree with the temperature control. The mechanism whereby this is accomplished is shown in Figure 4.

In Figure 4, the coil 20 is shown as energized from alternating voltage source 24 through the switch 26. The latter assumes the closed or conducting condition when current flows through the winding 26a and the open or non-conducting condition when no current flows through winding 26a. Winding 26a is energized from the circuit which may be traced from source 24, through winding 26a, and switches 28 and 30 back to source 24.

Switch 28 is a normally open switch controlled by winding 28a. Switch 30 is a normally closed switch controlled by winding 30a. Winding 28a is energized from source 24 when switch 32 is closed and either switch 34 or switch 36 is closed. Winding 30a is energized when switch 38 is closed.

Switches 32 and 34 are motor operated switches which open and close as motors 32' and 34', respectively, rotate. These motors are energized directly from source 24 and rotate continuously. The switch 32 is adjusted to close the circuit approximately 98 percent of the time and open the circuit the remaining time. The switch 34 is adjusted to close the circuit from 10 to 50 percent of the time, the exact value being chosen to supply the amount of heat normally required by the furnace.

Switches 36 and 38 are thermostatic control switches responsive to the furnace temperature. Switch 36 closes when the temperature falls below a predetermined minimum value and switch 38 closes when the temperature rises above a predetermined maximum value. For example, switch 36 may close below about 1300° F. and switch 38 close above about 1320° F.

The switches 36 and 38 may be any one of several types well known in the art. They may, for example, include bimetallic elements mounted to partake of the furnace temperature. The bimetallic elements for switch 36 tend to open with increased temperature and are set to open at approximately 1300° F. The bimetallic elements for switch 38 tend to close with increased temperature and are set to close at approximately 1320° F.

Operation of the thermostatic control system is as follows. When the furnace temperature is below the lower limit, switch 36 closes as shown in Figure 4 to energize winding 28a through switch 32. Thus, switch 28 closes and winding 26a is energized to apply energizing current from source 24 to winding 20.

Approximately 98 percent of the time, switch 32 will be in the closed position to energize winding 28a. However, the remaining two percent of the time this switch will be open. Transition between these conditions takes place suddenly at time intervals fixed by the construction of the motor 32'. In a practical furnace, for example, the transition may occur at 60 second intervals so that the switch 26 is closed about 58 seconds and then opened for two seconds.

The sudden interruption of power to winding 20 removes suddenly the longitudinal fluid pressure in the channels 14 and 16 to cause change of the fluid levels in reservoirs 10 and 12 from the condition of Figure 2 to that of Figure 3. The resultant flushing of channels 14 and 16 at time intervals of about one minute provides cleansing action to prevent build-up of deposits such as 22, Figure 5, and achieved timed mixing action which effectively prevents undue temperature differences between the reservoirs.

When the temperature of the furnace rises above about 1320° F., switch 38 closes. This energizes winding 30a to open switch 30 and deenergize winding 26a, thus opening switch 26 to deenergize the furnace to cause the temperature thereof to decrease. At this time, however, the timer motor 35' takes control to apply energizing power at predetermined time intervals. This causes timed flushes in the furnace to prevent any possible deposits during the time switch 38 is closed.

Preferably motor 35' is of the type operable to open switch 35 for a few seconds each minute. Thus, winding 30a is deenergized a few seconds each minute and switch 30 permitted to close for that portion of each minute. This creates timed flushing action without significantly heating the charge in the furnace.

In the neutral condition of the furnace when the temperature is intermediate about 1300° F. and 1320° F., switches 36 and 38 are both open. The winding 20 is therefore normally deenergized. However, the switches 32 and 34 are simultaneously closed part of this time and thereby energize winding 28a to apply power to the furnace. If, for example, the motors 32' and 34' each execute one cycle each minute, and the former closes switch 32 98 percent of the time and the latter closes switch 34 10 to 50 percent of the time, there will be one cycle of operation of switch 26 each minute and energy will be applied to winding 20 approximately 10 to 50 percent of the time depending on the exact setting of switch 34. In the typical furnace switch 34 might be set to be closed 50 percent of the time.

The foregoing control action is shown graphically in Figure 6 for an exaggerated temperature variation above and below the neutral or intermediate range. As indicated, during time A and B when the temperature is in the neutral zone between the upper and lower limits, heat is applied substantially 50 percent of the time to cause a slow increase in the furnace temperature. Moreover, the heat goes on and off once each minute to cause a total of ten surges of fluid flow in the five minute period shown.

When the temperature rises above the upper limit at time B, Figure 6, the power is turned off. However, due to the action of motor 35' and the switches 38 and 39, application of power takes place for a short pulse once each minute to create five sets of fluid surges in the five minute period required for the temperature to return to the neutral or intermediate range.

At time C, when the temperature has again reached the intermediate range two flushes per minute takes place as after time A to give a total of 10 flushes in the five minute time period C—D.

Between time D and time E, the temperature is below the lower limit of 1300° F. and heat is applied substantially continuously as shown in Figure 6. However, for a period of about two seconds each minute the heating is discontinued to give the flushing action. There are six of these periods in the six minute interval from D to E. Actually two flushes occur at each of these six times but since they are spaced only by two seconds, they appear as a single action in the chart of Figure 6.

It will be observed that the effect of the control shown in Figure 6 is to apply energy to the furnace in timed pulses, the average value of the energy supplied by the pulses being increased as the temperature decreases to tend to maintain constant temperature therein.

Because the thermal inertia of the furnace is relatively large, there is no tendency of the sudden power changes to impart dips or rises to the furnace temperature. Thus, the temperature follows a relatively smooth variation as shown in Figure 6.

The recurrent sudden energization of the winding 20 causes the normally equal levels of the fluid in reservoirs 10 and 12 shown in Figure 3 to change to the unbalanced levels of Figure 2, thereby causing surges of fluid flow through channels 14 and 16 and preventing build-up of undesired deposits thereon. Sudden deenergization of the winding 20 has the opposite effect to produce similar flushing and mixing action.

The foregoing control structure is applicable to a furnace of the type in which temperature is controlled by varying the time intervals between pulses of full energizing power. If it is desired to maintain temperature by varying the rate of energy input while it is continuously applied, the benefits of the present invention can be achieved by providing elements to deenergize the furnace at selected time intervals, such as every 60 seconds, to achieve timed flushing actions.

The furnace structure which defines reservoirs 10 and 12 and the channels 14 and 16 therebetween is constructed from bricks or the like in the frame defined by metal plates 40, Figure 2. The bricked structure is lined with the refractory lining 42 which is shaped to define the reservoirs and channels and which is capable of containing the molten metal without damage. Removable covers 44 are preferably provided to minimize the tendency of the molten metal in reservoirs 10 and 12 to oxidize and to minimize heat loss from the charge of molten metal.

The switches 38 and 39 are preferably mounted in or adjacent to one of the reservoirs 10 or 12. They, therefore, partake of the temperature of the fluid in that one reservoir and regulate the application of energizing power accordingly. The timed mixing action associated with energizing the furnace in pulses of power provides mixing action which causes the temperature in each reservoir to partake of the temperature of the other.

From the foregoing description it will be evident that the temperature of the furnace is controlled in the conventional manner but that when the temperature is below the heat-applying value, power input is recurrently interrupted and when the temperature is in the neutral range, power input is applied in successive pulses. When the temperature is in the upper zone, power is applied in very short timed pulses. These timed sudden changes in power provide the flushing action requisite to effective prevention of build-up of deposits at all temperatures of furnace operation.

The foregoing description is based on the structure shown in Figures 1 and 2 where the cross-sectional area of the channels 14 and 16 is changed to make their centers longitudinally displaced from the position of the core 18 and winding 20. I have discovered, however, that energization of the furnace may be made to produce an unbalance in fluid level by spacing the centers of the channels relative to the coil and core in other respects as well.

In Figure 7, the core 18 is longitudinally displaced relative to the center of the channel 16. That is, the center of channel 16, indicated at 16a, is displaced relative to the center 18a of core 18 and coil 20 in direction that is primarily along the length of that channel. When energizing power is applied to coil 20, a longitudinal fluid pressure is established in channels 14 and 16 to cause the relative fluid levels in reservoirs 10 and 12 to shift. This pressure may be caused to flush the channels at predetermined time intervals by use of means to change the energizing power at predetermined time intervals. One method of accomplishing this is described above in connection with Figure 4.

The structure of Figure 8 is like that of Figure 7 but the core 18 and coil 20 are displaced in direction transverse to the axis of the channels 14 and 16. That is, the center of core 18 and coil 20, indicated at 18a, is positioned above the center of the channel 16, indicated at 16a. When energizing power is applied to winding 20, the fluid levels in reservoirs 10 and 12 are shifted relative to each other, thus causing flushing action that may be utilized as described above to maintain the channels free from deposits.

In the structure of Figure 9, longitudinal fluid pressure in the channels 14 and 16 is established by rocking the furnace about the axis of shaft 42 from which it is rockably supported. In the specific structure shown, this rocking movement is accomplished by solenoid 44 which, when energized, draws plunger 46 downwardly to overcome the bias of the centering springs 48 and tilt the furnace as indicated by the dotted lines of Figure 9.

The shaft 42 is oriented in direction transverse to the direction of spacing reservoirs 10 and 12 so that tilting the furnace about this shaft necessarily raises one reservoir relative to the other.

When solenoid 44 is energized to tilt the furnace to the position of the dotted lines in Figure 9, fluid flows from reservoir 12 to reservoir 10 through channels 14 and 16 to flush these channels. By causing this tilting to take place at predetermined time intervals, the furnace may be flushed with sufficient regularity to overcome any tendency for deposits to take place and to overcome any tendency for temperature differences to exist between the reservoirs.

Further in accordance with the present invention, application of heating power to the furnace is interrupted simultaneously with the furnace tilting movements. This may, for example, be accomplished by energizing solenoid 44 and winding 20 from interconnected switches 46 and 48, Figure 10. Thus, when energy from source 50 is applied to solenoid 44, winding 20 is de-energized and when energy from source 50 is applied to winding 20, solenoid 44 is deenergized. The switches 46 and 48 are preferably actuated by a time control mechanism to impart timed tilting movements to the furnace and thereby achieve effective flushing action at time intervals sufficiently short to prevent build-up of deposits in channels 14 and 16.

In the foregoing specification and the appended claims, I have used the term "dross" to identify the deposit that tends to form in the channels of the furnace. It will, of course, be understood that I use this term broadly to define the material deposited without regard to its actual composition.

The time period required for each cycle of switches 32 and 34 is not critical so long as this time is made sufficiently short to avoid any tendency of the dross to deposit firmly on the walls of the channels and to prevent creation of undue temperature differences in the fluid.

It is desirable that the longitudinal pressure differential established in channels 14 and 16 be in direction to raise the level of the fluid in ladling or pouring reservoir relative to the level in charging reservoir. This causes the initial flushing action of the channels to be in direction tending to cause movement of the dross into the charging reservoir and thus to avoid contamination of the melt in the ladling chamber.

While I have shown and described a specific type of induction furnace it will, of course, be evident that the principles of the present invention may be applied to other furnaces as well. Specifically, the present invention may be applied to three phase induction furnaces where three or more channels join the fluid reservoirs.

From the foregoing description it will be evident that in accordance with the present invention the furnace under one condition of operation (power on, Figures 1 and 2 or current flow in solenoid 44, Figure 9) establishes a difference in fluid levels in reservoirs 10 and 12 and in another condition of operation (power off, Figures 1 and 2 or no current flow in solenoid 44, Figure 9), this pressure is relaxed. Flushing action is achieved by establishing the first condition in timed pulses, thereby preventing build-up of deposits in the channels and preventing temperature differentials between the reservoirs.

The structure of the subject invention avoids need for the use of mechanical tools to clean channels 14 and 16. Use of such tools, even when effective to remove the loose deposits in the channels, tends to roughen the interiors thereof and increase the tendency for further deposits. Even when such tools are applied methodically, the walls of the channels eventually reach the point wherein it becomes impossible to overcome the buildup of deposits thereon. Moreover, it is unnecessary to design the furnace in a manner providing access to the channels for the purpose of applying cleaning tools.

In the structures of Figures 1 to 8, the effect of energizing current flow is to cause the fluid pressure differential between reservoirs 10 and 12. In addition, this unbalances the application of heat to the reservoirs and tends to cause greater flow of heat into the reservoir with the high level. In a furnace where it is desired to impart greater heating to one reservoir, as compared to the other, the core 18 and coil 20 may be mounted in spaced positions relative to the centers of the channels to accomplish the desired degree of unbalance in heat input.

One situation wherein an unbalanced application of heat may be desired entirely apart from flushing action is the case of a melting furnace where charge is continuously fed to one reservoir in a solid state and must be melted. In this case, a melting reservoir may require greater heat input than the ladling or pouring reservoir and for that reason, it may be desirable to place the core 18 and coil 20 in positions to cause the level in the former reservoir to rise above the level of the latter reservoir.

In the appended claims, I have used the term "center point" of a magnetic flux path to indicate the center of the figure defined by that path. If, for example, the flux path is rectangular this point is the point of intersection of a pair of lines joining the opposite pairs of corners. When the center point of the magnetic flux paths coincide with the center points of the channels 14 and 16, Figure 1, the time varying flux creates no fluid pressure differential.

While I have shown and described a particular embodiment of my invention it will, of course be understood that various modifications and alternative constructions thereof may be made without departing from the true spirit and scope of my invention and that I intend by the appended claims to cover all such modifications and alternative constructions as fall within the true spirit and scope of my invention.

What I claim as new and desire to secure by Letters Patent of the United States is:

1. In an induction furnace of the type having a pair of fluid reservoirs connected by a channel, the improvement which comprises means defining a magnetic flux path encircling said channel and having a center point spaced from the centroid of the area defined by an axial cross section through said channel and means operative to establish a time varying magnetic flux in timed pulses in said path to cause the fluid level in one of said reservoirs to rise relative to the fluid level in the other.

2. In an induction furnace, means defining a pair of reservoirs connected by a channel having greater cross-sectional area toward one end than the other, a magnetic core linking said channel and having a center point spaced from the centroid of the area defined by an axial cross section through the channel, and means to establish a time-varying magnetic flux in timed pulses in said core to cause electric current flow in said channel and to create a change in fluid level between said reservoirs.

3. In an induction furnace, means defining a pair of reservoirs connected by spaced channels, each of said channels being of uniform section throughout the major part of its length having a flared enlarged portion facing one of said reservoirs, a magnetic core having a center leg extending between said channels and defining loops encircling said channels substantially midway between said reservoirs, means to produce a time varying magnetic flux in timed pulses in said core to cause current flow in said channels and a longitudinal fluid pressure therein to raise the fluid level in one of said reservoirs relative to the other.

4. In an induction furnace of the type having a pair of spaced fluid reservoirs, the improvement which comprises a channel extending between said reservoirs and having greater cross-sectional area near one of said reservoirs than the other, and means to establish current flow in said channel in timed pulses thereby to establish a longitudinal fluid pressure therein and repeatedly to flush said channel.

5. In an induction furnace, means defining a pair of reservoirs connected by spaced channels each of which has greater cross-sectional area toward one of said reservoirs than the other, a magnetic core defining a loop with one portion extending between said channels, and means to establish a time varying magnetic flux in said core at predetermined time intervals to flush said channels at successive instants of time.

6. In an induction furnace, means defining a pair of reservoirs connected by spaced channels each of which has a conically shaped enlarged portion facing one of said reservoirs, a magnetic core defining a pair of spaced windows through which said channels extend, means to establish a time varying magnetic flux in said core at predetermined time intervals to cause current flow in said channels thereby to flush said channels at successive instants of time.

7. In combination, an induction furnace having a pair of fluid reservoirs connected by spaced channels each of which has greater cross-sectional area towards one of said reservoirs than the other, means operative to produce a time varying magnetic flux encircling said channels to produce longitudinal fluid pressure therein, elements operative in response to the fluid temperature in said reservoirs to control said first means to tend to maintain constant temperature therein, and means operative to override said last means at predetermined time intervals to overcome the action thereof and interrupt said flux to flush said channels.

8. In combination, an induction furnace having a pair of fluid reservoirs connected by spaced channels each of which has a greater cross-sectional area towards one of said reservoirs than the other, means to produce a time varying magnetic flux encircling said channels to produce longitudinal fluid pressure therein, and temperature responsive means to energize said first means in timed pulses, the average value of energy supplied by said pulses being increased as the furnace temperature decreases to tend to maintain constant temperature therein.

9. An electric furnace for use with a source of alternating voltage comprising in combination means defining a pair of reservoirs to receive a charge and a pair of spaced channels connecting said reservoirs, said channels each having enlarged portions facing one of said reservoirs, a magnetic core defining a flux path encircling one of said channels, a winding on said core, means defining a circuit from said source to said winding, means responsive to the temperature of said furnace to close said circuit when said temperature falls below a predetermined value and to interrupt said circuit when said temperature exceeds a predetermined value, and time controlled elements operative to open said circuit at predetermined time intervals when said circuit is closed.

10. The induction furnace comprising in combination, means defining a pair of reservoirs and a pair of channels in communication therewith, said channels having enlarged portions facing one of said reservoirs, a magnetic core encircling said channels, a winding encircling said core, and means to energize said winding in timed pulses having increased average value as the temperature of said furnace decreases.

11. In an induction furnace of the type having a pair of fluid reservoirs connected by a channel, the improvement which comprises means defining a magnetic flux path encircling said channel and spaced relative to the center of said channel in the longitudinal direction thereof, and means operative to establish a time varying magnetic flux in timed pulses in said path to cause the fluid level in one of said reservoirs to rise relative to the fluid level in the other.

12. In an induction furnace of the type having a pair of fluid reservoirs connected by a channel, the improvement which comprises means defining a magnetic flux path encircling said channel and spaced relative to the center of said channel in direction transverse to the length thereof, and means operative to establish a time varying magnetic flux in timed pulses in said path to cause the fluid level in one of said reservoirs to rise relative to the fluid level in the other.

13. In an induction furnace of the type having a pair of fluid reservoirs connected by a channel, the improvement which comprises means defining a magnetic flux path encircling said channel and having a center spaced relative to the center thereof, means to establish a time varying magnetic flux in said path to cause the fluid level in one of said reservoirs to rise relative to the fluid level in the other, and means operative to energize said last means in timed pulses to flush said channel at predetermined time intervals.

14. In an induction furnace of the type having a pair of fluid reservoirs connected by a channel, the improvement which comprises means defining a magnetic flux path encircling said channel and spaced relative to the center thereof in substantially the longitudinal direction thereof, means operative to establish a time varying magnetic flux in said path to cause the fluid level in one of said reservoirs to rise relative to the fluid level in the other, and means to energize said last means in timed pulses to flush said channel at predetermined time intervals.

15. In an induction furnace of the type having a pair of fluid reservoirs connected by a channel, the improvement which comprises means defining a magnetic flux path encircling said channel and spaced relative to the center of said channel in direction transverse to the length thereof, means operative to establish a time varying magnetic flux in said path to cause the fluid level in one of said reservoirs to rise relative to the fluid level in the other, and means to energize said last means in timed pulses to flush said channel at predetermined time intervals.

16. In an induction furnace of the type having a pair of spaced reservoirs and in which it is desired to apply greater heat to one of said reservoirs than the other, the improvement which comprises a pair of channels connecting said reservoirs and each having a greater cross-sectional area facing said other reservoir, and means to produce in timed pulses a time varying magnetic flux encircling said channels at a position substantially midway said reservoirs.

17. In combination, means defining an induction furnace having a pair of reservoirs and a channel extending therebetween, elements operable when energized to apply heating power to the furnace and to produce longitudinal pressure in the channel means in the furnace cooperating with said elements to produce different fluid levels in said reservoirs, means operative in response to the temperature of the furnace to energize the elements to maintain a predetermined temperature in the furnace, and elements operative suddenly to change the energization of said first elements independently of the temperature in the furnace at predetermined time intervals to flush the channel and prevent deposits therein.

18. In combination, means defining an induction furnace having a pair of reservoirs and a channel extending therebetween, elements operable when energized to apply heating power to the furnace and produce longitudinal pressure in the channel means in the furnace cooperating with said elements to produce different fluid levels in said reservoirs, means responsive to the temperature of the furnace operative to energize said elements to maintain constant said temperature, and elements operative independently of the temperature of the furnace to deenergize said first elements at predetermined time intervals thereby to flush the channel.

19. In combination, means defining an induction furnace having a pair of reservoirs and a channel extending therebetween, elements operable when energized to apply heating power to the furnace and to produce longitudinal pressure in the channel means in the furnace cooperating with said elements to produce different fluid levels in said reservoirs, means operative to energize said elements when the temperature in the furnace is below a predetermined limit, and elements operative independently of the temperature of the furnace to deenergize said first elements at predetermined time intervals when said first elements are energized.

20. In combination, means defining an induction furnace having a pair of reservoirs and a channel extending therebetween, elements operable when energized to apply heating power to the furnace and to produce longitudinal pressure in the channel means in the furnace cooperating with said elements to produce different fluid levels in said reservoirs, means operative to energize said elements, elements operative to interrupt energization of said first elements when the temperature in the furnace exceeds a predetermined maximum, and means operative to energize said first elements at predetermined time intervals irrespective of the temperature of the furnace.

21. In combination, means defining an electric furnace having a pair of reservoirs and a channel extending therebetween, elements operable when electrically energized to apply heating power to the furnace and to produce longitudinal pressure in the channel means in the furnace cooperating with said elements to produce different fluid levels in said reservoirs, means defining an incomplete energizing circuit for said elements, elements responsive to the temperature of the furnace operative to complete said circuit to apply energizing power to said first elements as required to maintain a predetermined temperature in said furnace, and elements operative independently of the temperature of the furnace to interrupt the circuit at predetermined time intervals to flush the channel.

22. In combination, means defining an electric furnace having a pair of reservoirs and a channel extending therebetween, elements operable when electrically energized to apply heating power to the furnace and to produce longitudinal pressure in the channel means in the furnace cooperating with said elements to produce different fluid levels in said reservoirs, means defining an incomplete energizing circuit for said elements, elements responsive to the temperature of the furnace to complete said circuit when said temperature falls below a predetermined minimum and to interrupt said circuit when said temperature exceeds a predetermined maximum, and time controlled elements operative to interrupt the circuit at predetermined time intervals independent of the temperature of the furnace when the temperature is below the minimum and to establish the circuit at predetermined time intervals independent of the temperature of the furnace when the temperature is above the maximum.

AUGUST W. LILLIENBERG.

REFERENCES CITED

The following references are of record in the file of this patent:

UNITED STATES PATENTS

| Number | Name | Date |
|---|---|---|
| 1,313,274 | De Barros | Aug. 19, 1919 |
| 1,532,090 | Unger | Mar. 31, 1925 |
| 1,589,266 | Summey | June 15, 1926 |
| 1,595,968 | Unger | Aug. 10, 1926 |
| 1,626,485 | Unger | Apr. 26, 1927 |
| 1,669,109 | Weed | May 8, 1928 |
| 1,751,856 | Greene | Mar. 25, 1930 |
| 1,751,912 | Greene | Mar. 25, 1930 |
| 1,811,644 | Northrup | June 23, 1931 |
| 1,981,631 | Northrup | Nov. 20, 1934 |
| 1,994,629 | Arkema | Mar. 19, 1935 |
| 2,231,695 | Vedder | Feb. 11, 1941 |
| 2,375,049 | Tama et al. | May 1, 1945 |
| 2,381,523 | Tama et al. | Aug. 7, 1945 |
| 2,400,472 | Strickland | May 14, 1946 |
| 2,430,640 | Johnson | Nov. 11, 1947 |

FOREIGN PATENTS

| Number | Country | Date |
|---|---|---|
| 21,416 | Great Britain | of 1906 |
| 245,213 | Switzerland | July 1, 1947 |
| 291,450 | Great Britain | May 2, 1929 |